(12) United States Patent
Arora et al.

(10) Patent No.: US 6,658,559 B1
(45) Date of Patent: Dec. 2, 2003

(54) METHOD AND APPARATUS FOR ADVANCING LOAD OPERATIONS

(75) Inventors: Judge Ken Arora, Cupertino, CA (US); Gregory Scott Mathews, Santa Clara, CA (US); Ghassan W. Khadder, San Jose, CA (US); Sreenivas A. Reddy, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/476,607

(22) Filed: Dec. 31, 1999

(51) Int. Cl.[7] .............................................. G06F 9/312
(52) U.S. Cl. ...................................... 712/245; 712/225
(58) Field of Search ........................... 712/1, 225, 226, 712/245

(56) References Cited

U.S. PATENT DOCUMENTS

| | | | |
|---|---|---|---|
| 5,404,484 A | | 4/1995 | Schlansker et al. |
| 5,758,051 A | * | 5/1998 | Moreno et al. ................ 714/2 |
| 5,802,337 A | * | 9/1998 | Fielden ....................... 712/216 |
| 5,848,256 A | * | 12/1998 | Call et al. .................... 712/216 |
| 5,872,986 A | * | 2/1999 | Heeb ............................. 712/1 |
| 5,889,974 A | * | 3/1999 | Harriman et al. ........... 711/117 |
| 5,903,749 A | | 5/1999 | Kenner et al. |
| 5,999,727 A | * | 12/1999 | Panwar et al. .............. 712/218 |
| 6,189,088 B1 | * | 2/2001 | Gschwind ................... 712/216 |
| 6,230,254 B1 | * | 5/2001 | Senter et al. ............... 712/206 |

\* cited by examiner

*Primary Examiner*—Eric Coleman
(74) *Attorney, Agent, or Firm*—Blakely, Sokoloff, Taylor & Zafman LLP

(57) ABSTRACT

A computer product, method, and apparatus for causing a computer to perform load operations in a particular way are disclosed. The computer is made to replace a load instruction at a particular location in a computer program instruction sequence with two instructions, an advanced load instruction and a load check instruction. The advanced load instruction is inserted into the instruction sequence up-stream from where the original load instruction was located, and may be inserted above store instructions. The load check instruction is inserted into the instruction sequence after the store instructions. An Advanced Load Address Table (ALAT) structure, containing physical address data and validity data for each non-speculative advanced load, is updated with data about each advanced load and each store instruction executed, and queried on execution of each load check instruction about whether or not a particular advanced load is safe to use. An advanced load speculative pipeline and speculative invalidation pipeline are similarly queried regarding speculative advanced loads.

6 Claims, 12 Drawing Sheets

| PHYSICAL ALAT ARRAY | | |
|---|---|---|
| REGISTER ID | ADDRESS | VALIDITY |
|  |  |  |
|  |  |  |
|  |  |  |
|  |  |  |
|  |  |  |
|  |  |  |
|  |  |  |
|  |  |  |
|  |  |  |

FIG. 8

| PHYSICAL ALAT ARRAY ||||
| --- | --- | --- | --- |
| REGISTER ID | ADDRESS | OCTET | VALIDITY |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |

FIG. 11

METHOD AND APPARATUS FOR ADVANCING LOAD OPERATIONS

BACKGROUND OF THE INVENTION

1. Field of the Invention

This invention relates generally to computers, and more particularly, to a computer product, method, and apparatus for load operations.

2. Description of the Related Art

Modern computers contain microprocessors, which are essentially the brains of the computer. In operation, the computer uses the microprocessor to run computer programs.

A computer program might be written in a high-level computer language, such as C or C++, using statements similar to English, which are then translated (by another program called a compiler) into numerous machine language instructions. A program might also be written in assembly language, and then translated (by another program called an assembler) into machine language instructions. In practice, every computer language above assembly language is a high-level language.

Each computer program contains numerous instructions which tell the computer what it must do to achieve the desired goal of the program. The computer runs a particular computer program by executing the instructions contained in that program.

Modem computers also contain memory. The memory might be used to store computer program data, or it might be used to store computer program instructions. In general, every individual location in a computer memory has an address associated with it. The address might be a physical address or a virtual address. A physical address is one that corresponds to a fixed hardware memory location; a virtual address does not. Specifically, in microprocessors which support virtual addressing, computer programs reference virtual addresses, which are then mapped by memory management hardware onto physical addresses before the memory is actually read or written.

A memory cache is a special sub-system in which frequently used data is stored for quick access, e.g. it stores the contents of frequently accessed memory locations and the address where those data items belong. When a microprocessor attempts to perform a load reference to an address in memory, the cache is checked to see whether it holds that address/data. If it does, the data is returned to the microprocessor from the cache and no reference is sent to memory. If it does not, a regular memory access occurs and the missing data is commonly copied from memory into the cache. When a microprocessor attempts to perform a store reference to an address in memory, again the cache is checked to see whether it holds that address. If it does, the cache will be updated with the store data. The store may also be sent to memory (write-through policy) or not (write-back policy). If the cache does not hold the store address (or the line in the cache is also contained within another device's cache, i.e. in a SHARED state), then the store may be sent directly to memory (write-through policy) or the missing data may be copied from memory into the cache and then updated (in the cache) with the store data (typical write-back policy). Accessing a memory cache is faster than accessing memory.

RAM or Random Access Memory, is a semiconductor-based memory that can be read and written by the microprocessor or other hardware devices. The storage locations can be accessed in any order. RAM is the type of memory frequently used as main memory on a personal computer.

Most modern microprocessors use a design technique called pipelining, where each operation is performed in a series of pipeline stages. In operation, a microprocessor fetches an instruction from memory and feeds it into one end of the pipeline. The pipeline is made up of several stages, each stage performing some function or process necessary or desirable to process the instruction before passing the instruction to the next stage. Thus the output of one stage serves as input to a second, the output of the second stage serves as input to the third, and so on. Therefore, in any clock cycle, more than one instruction may be in the process of execution (one per stage, or more than one per stage if the stages have multiple functional units).

Ideally, pipelining speeds execution time by ensuring that the microprocessor does not have to wait for instructions; when it completes execution of one instruction, the next is ready and waiting.

In some advanced microprocessors, the pipeline is designed to support the processing of selected instructions speculatively. Speculative execution is a technique in which certain instructions are executed and results made available before they are determined to be needed by the program. Consequently, it also involves determining whether the need ever actually occurs, and if it does, making sure that the results of what was done ahead of time are still valid. Once all these questions about a speculatively executed instruction have been answered favorably, the instruction is said to be resolved, retired, or architecturally committed, and is no longer speculative.

One class of instructions frequently contained in a computer program are store instructions. Store instructions are assembly or machine level instructions that cause information to be written by the executing processor into a particular location (address) in memory.

Another class of instructions frequently contained in a computer program are load instructions. Load instructions are assembly or machine level instructions that cause data to be taken from a particular location (address) in memory, and placed into a specified register within the executing processor so that the data can be acted upon during execution of a subsequent instruction.

An important source of performance loss in modern microprocessors is waiting for data to be returned from long latency load operations. In the sequence of instructions contained in a computer program, a load instruction often closely precedes the instruction that acts upon the data loaded. Because such an instruction needs to wait for the load operation to complete before it can begin its execution, time spent waiting for completion of the load operation delays execution of the computer program.

One technique used to reduce this delay involves changing the sequence of instructions in the computer program so that the load occurs earlier than it would in the normal sequence of instructions. This change in sequence may be done by the compiler. Moving a load up-stream from its normal position in the sequence of instructions is sometimes called advancing the load or boosting the load. The basic idea is to start the load operation as early as possible, giving as much time as possible for the load operation to complete before any instructions dependent on the load are encountered in the sequence of instructions. Store instructions, however, limit how far ahead a load instruction may be advanced. This limit arises because the compiler often cannot determine whether a load instruction and a store instruction conflict, that is, whether they are reading from and writing to overlapping physical memory locations.

In the unoptimized sample code fragment, add r1+r2→r3
    store [r4], r5
    sub r6−r7→r8
    load [r9]→r10
    and r10, r11→r12 the r1, r2, and so forth are registers. The brackets around r4 and r9 are used to denote that the contents of r4 and r9 are to be used as the addresses for the store and load operations. If the compiler cannot determine whether r4 and r9 are referring to overlapping physical memory locations, then r4 and r9 are referred to as being unresolved with respect to each other, or as undisambiguated memory addresses.

In this example, since the load instruction (the next-to-last instruction) and the instruction that uses the data loaded (the last instruction, i.e. the "and" instruction) are only separated by one clock cycle, then if the load instruction has a latency of over one clock cycle, the microprocessor will not have the data needed by the "and" instruction available in time, and, consequently, will need to defer or stall execution of the "and" instruction and potentially all later instructions.

Traditionally, a compiler will try to move the load instruction as far ahead as possible. In the optimized sample code fragment, add r1+r2→r3
    store [r4], r5
    load [r9]→r10
    sub r6−r7→r8
    and r10, r11→r12 the load instruction has been boosted to just below the store instruction. The load instruction is two clock cycles away from the dependent use "and" instruction. But unless the compiler can determine that the address of the load, r9, and the address of the earlier store instruction, r4, refer to non-overlapping memory addresses, it is not safe to move the load instruction past the store instruction. Moving the load above the store would be unsafe because if the load operation and the store operation are to overlapping target addresses, the load operation needs to get the data from the store operation. This mandatory requirement would be violated if the load instruction ended up earlier in the instruction sequence than the store instruction. Consequently, boosting of load instructions has been limited by the presence of store instructions.

The present invention is directed to overcoming, or at least reducing the effects of one or more of the problems mentioned above.

BRIEF DESCRIPTION OF THE DRAWINGS

Other objects and advantages of the invention will become apparent upon reading the following detailed description and upon reference to the drawings in which:

FIG. 8 illustrates details of an advanced load address table according to one embodiment of the present invention;

FIG. 11 illustrates details of an advanced load address table according to another embodiment of the present invention.

DETAILED DESCRIPTION OF SPECIFIC EMBODIMENTS

In one aspect of the present invention, provided is a set of instructions which, when executed by a computer, allow the computer to perform load operations speculatively by performing certain steps. The steps include replacing a load instruction located at a particular location in a computer program instruction sequence with two instructions, an advanced load instruction and a load check instruction. The advanced load instruction is inserted into the instruction sequence up-stream of the particular location at which the original load instruction was previously located (this may include placement of the advanced load up-stream of stores which preceeded the original load in program order and have not been disambiguated from the original load). The load check instruction is typically inserted into the instruction sequence prior to the first dependent use of the data returned by the advanced load, optionally at the particular location where the original load instruction was previously located. Executing the advanced load instruction causes the computer to perform the load operation that would have been performed by the original load instruction, earlier in the instruction sequence; executing the load check instruction causes the computer to determine whether or not the advanced load data may be used. If the advanced load data may be used, the load check instruction is treated as a no-op instruction. If the advanced load data may not be or should not have been used, the load check instruction causes the computer to perform a recovery operation.

According to another aspect of the invention, provided is an advanced load address table which, in operation, contains information about each advanced load. Coupled to the advanced load address table is lookup logic which queries the advanced load address table for information in response to a load check request.

According to another aspect of the present invention, included is an advanced load speculative pipeline and a speculative invalidation pipeline, both of which are coupled to the advanced load address table. Also included is prioritization logic coupled to both of these pipelines and to the load check lookup logic. In operation, the load check lookup logic queries the advanced load address table for information regarding committed advanced loads, and queries the prioritization logic for information regarding in-flight (not yet committed) advanced loads, in response to a load check request.

The present invention may allow a load instruction to be boosted or advanced ahead of a store instruction, so long as a subsequent load check instruction is used to determine whether or not the boosting was safe. If the boosting was safe, the load check passes; if it was not safe, the load check fails, as more fully described below. The computer product, method, and apparatus described and claimed in this patent application may be used to determine whether or not the boosting is safe.

Figure 1:
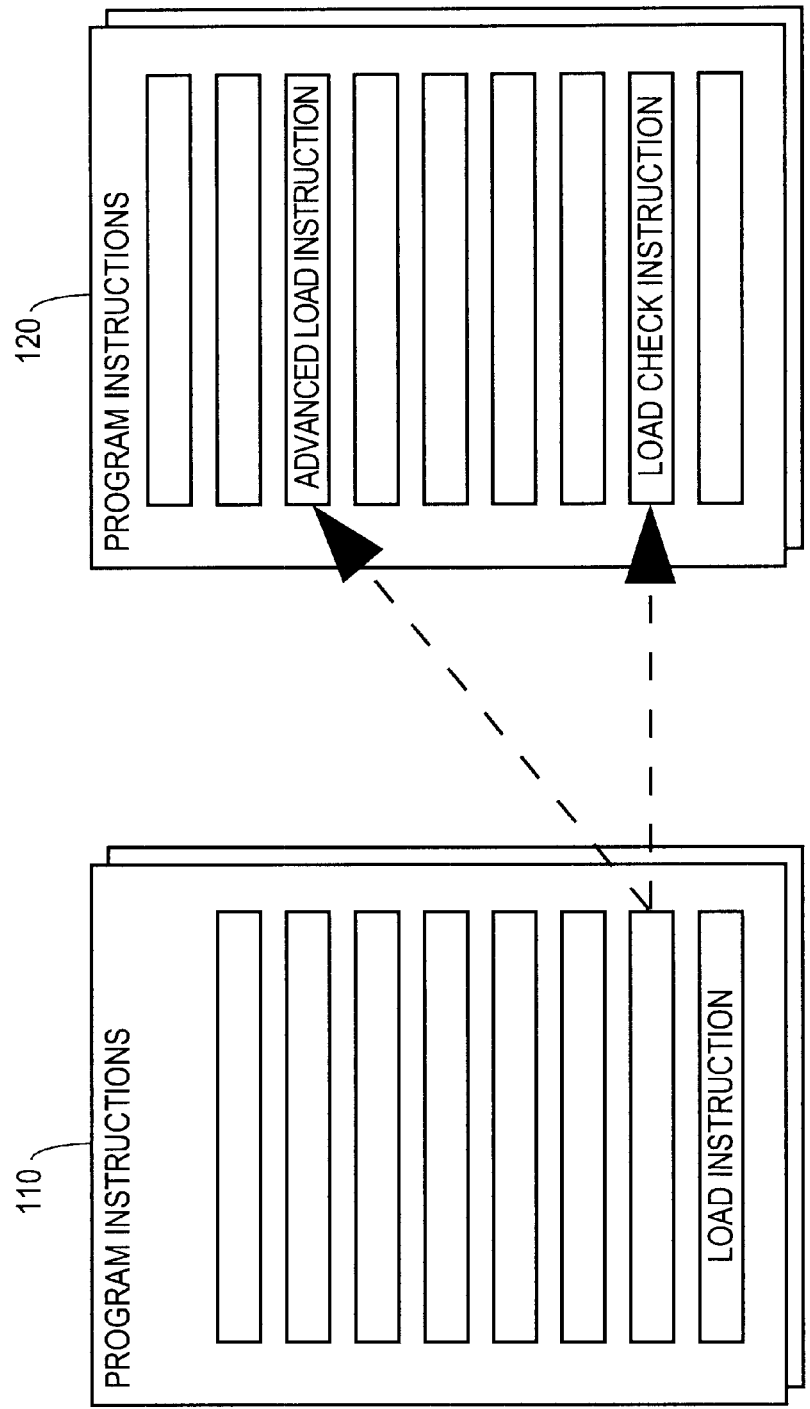
FIG. 1 illustrates replacing a load instruction with an advanced load instruction and a load check instruction according to one aspect of the present invention.
Figure 2:
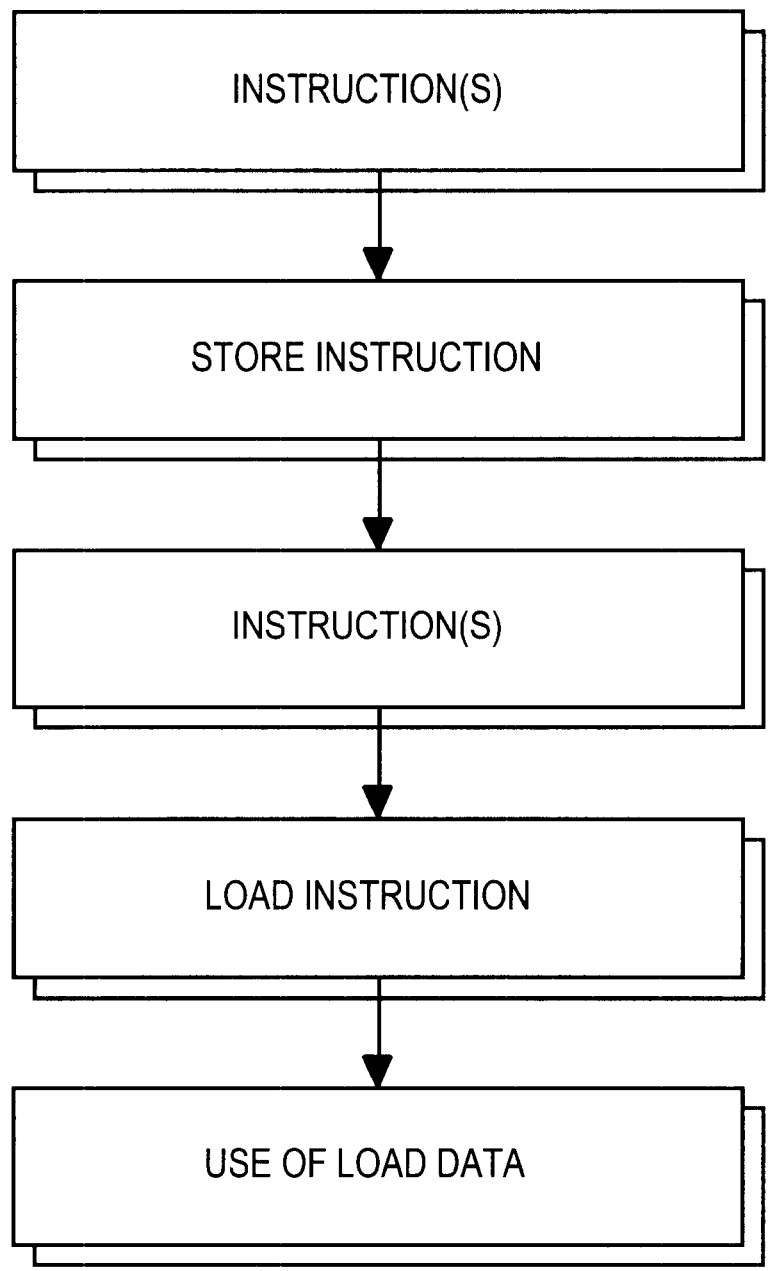
FIGS. 2 and 3 illustrate a sequence of computer program instructions.
Figure 3:
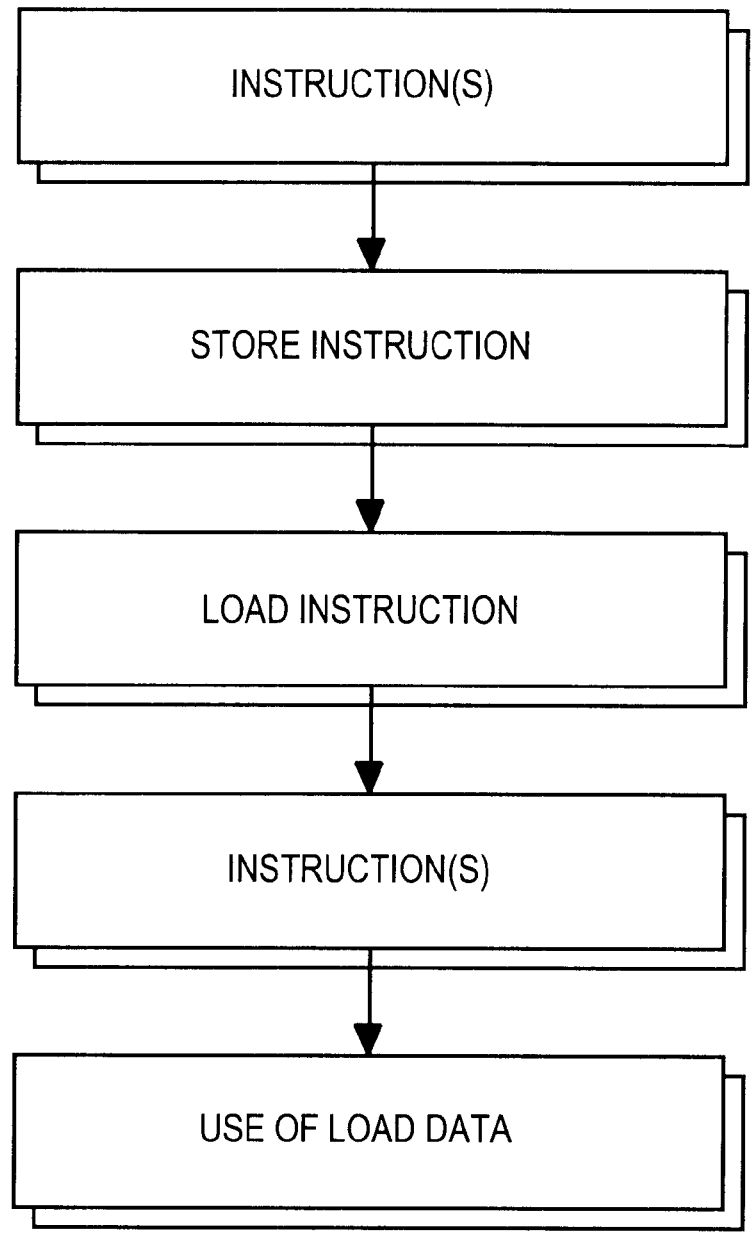

Referring now to the drawings, and in particular to FIG. 1, illustrated in block diagram form is a sequence of program instructions 110 containing a load instruction. According to one aspect of the present invention, the load instruction is replaced by two instructions, an advanced load instruction and a load check instruction, as illustrated in the program instruction sequence 120 of FIG. 1. The advanced load instruction is inserted into the program instruction sequence up-stream of where the load instruction was originally located. The load check instruction is inserted into the program instruction sequence before any dependent use and after the undisambiguated store, in this case, at the same location where the load instruction was originally located.

In the Modified Code Fragment 1:
    ld.a [r9]→r10
    add r1+r2→r3
    store [r4], r5
    sub r6−r7→r8
    ld.c [r9]→r10
    and r10, r11→r12

The Modified Code Fragment 1 corresponds to the unmodified code fragment set forth earlier, but with the instruction sequence changed in accordance with the present invention.

The instruction "ld.c" is one type of load check instruction, and the instruction "ld.a" is an advanced load instruction. Note that the advanced load instruction has been boosted up above the store instruction.

According to another aspect of the invention, again the load instruction is replaced by two instructions, an advanced load instruction and a load check instruction, as illustrated in the program sequence 120 of FIG. 1. The advanced load instruction is inserted into the program instruction sequence up-stream of where the load instruction was originally located. The load check instruction is inserted into the program instruction sequence after the undisambiguated store and may be placed after dependent uses (subject to the capabilities of the recovery code).

In the Modified Code Fragment 2:
    ld.a [r9]→r10
    add r1+r2→r3
    store [r4], r5
    sub r6−r7→r8
    and r10, r11→r12
    chk.a r10, Recover2

Recovery Code for Modified Code Fragment 2:
    Recover 2: ld [r9]→r10
        and r10, r11→r12
        return to op following chk.a above The Modified Code Fragment 2 corresponds to the unmodified code fragment set forth earlier, but with the instruction sequence changed in accordance with an embodiment of the present invention.

The instruction "chk.a" is another type of load check instruction. Note that the advanced load instruction has been boosted up above the store instruction.

FIGS. 2, 3, 4 and 4A illustrate the sequence of instructions contained in the unoptimized sample code fragment, the optimized sample code fragment, the first modified sample code fragment and the second modified sample code fragment according to embodiments of the present invention, respectively.

Figure 4:
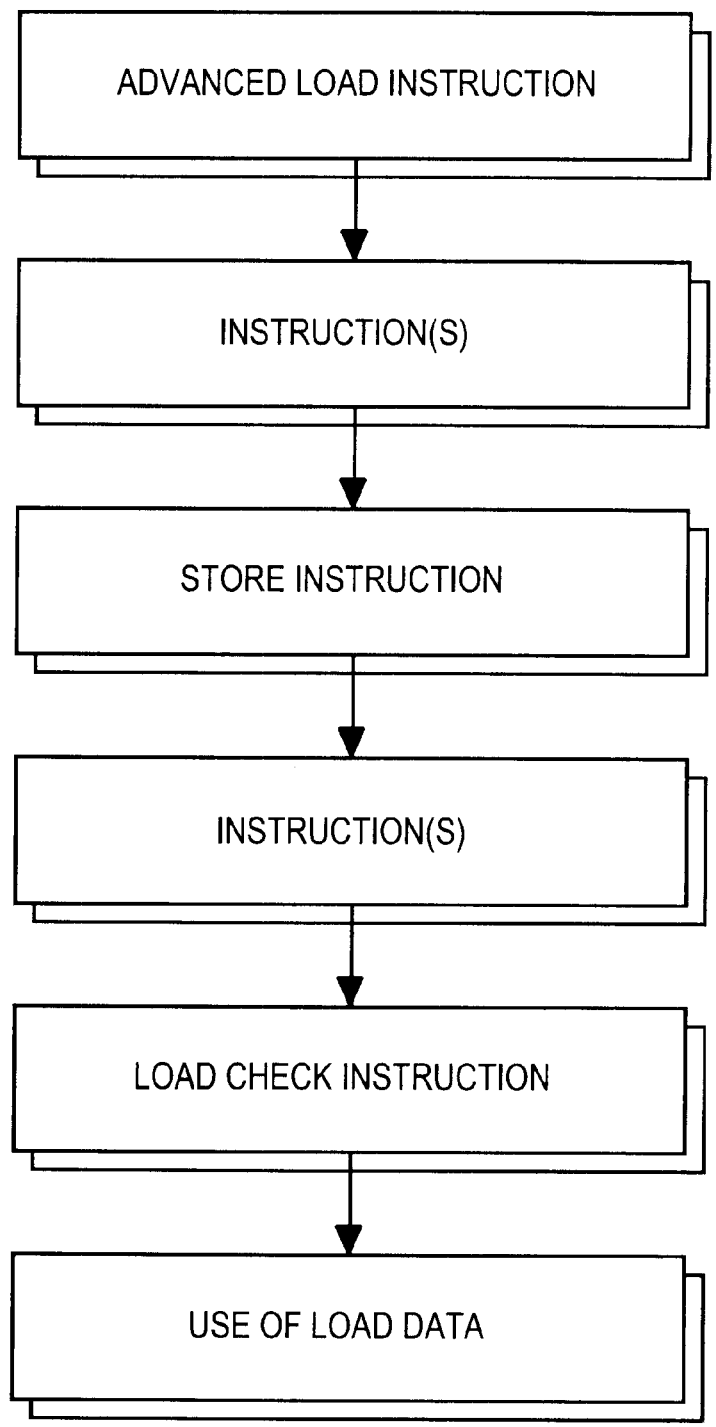
FIGS. 4 and 4a illustrate sequences of computer program instructions according to embodiments of the present invention.

As illustrated in FIGS. 1 and 4, the load instruction contained at a particular location in the computer program instruction sequence may be replaced by an advanced load instruction inserted into the instruction sequence up-stream of the particular location where the load instruction was originally located and a load check instruction inserted into the instruction sequence at the particular location where the load instruction was originally located. In the original instruction sequence, the load instruction was located immediately before the instruction that made use of the load data. Consequently, the load check instruction may be located in the same or nearby position in the instruction sequence. As will be apparent to those skilled in the art having benefit of this disclosure, the load check instruction could be located farther up-stream in the instruction sequence, if desired. The load check instruction is located such that it is executed prior to, or optionally in the same clock cycle as, the first dependent use instruction that uses the advanced load data.

Figure 4A:
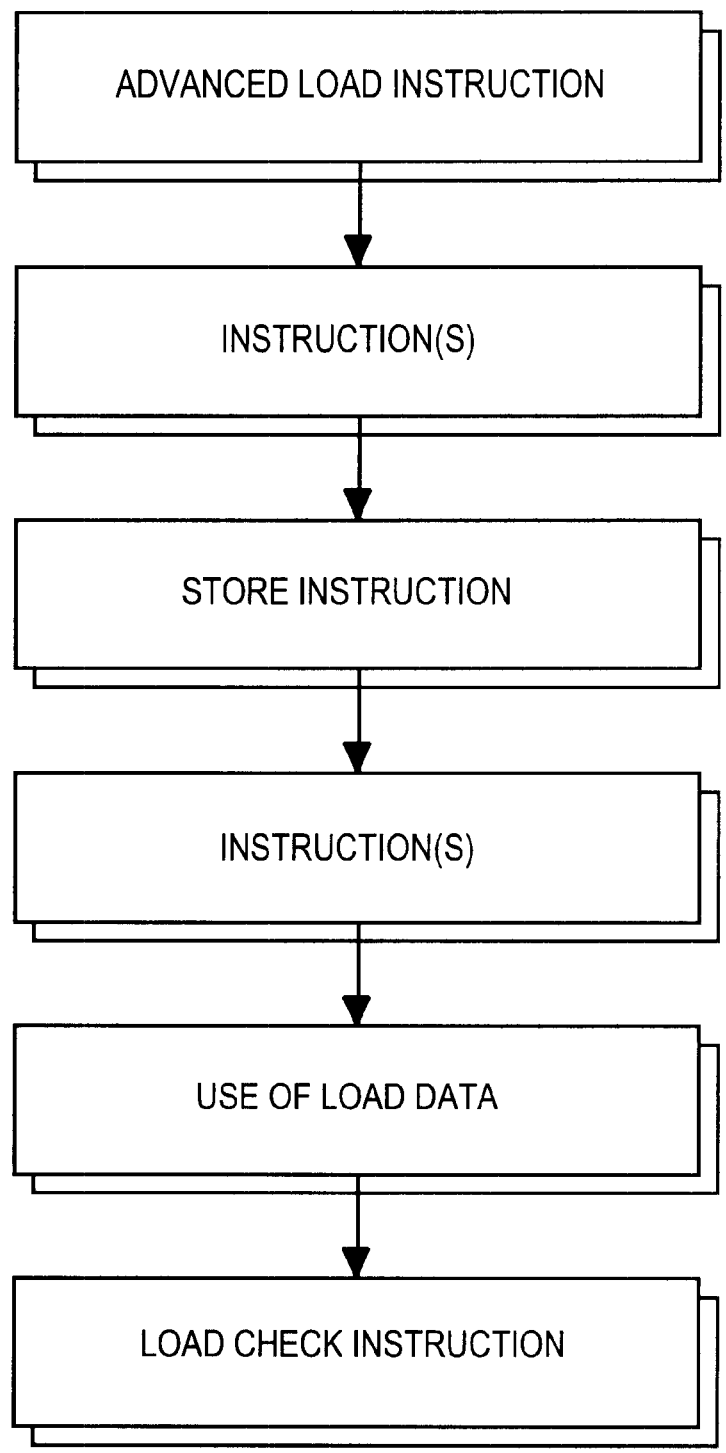

As illustrated in FIGS. 1 and 4A, the load instruction, contained at a particular location in the computer program instruction sequence, may be replaced by an advanced load instruction, inserted into the instruction sequence up-stream of the particular location where the load was originally located. However, when the load check instruction is inserted, it may not be necessary to place this instruction before the first dependent use so long as there is recovery code written to correct for any improper uses.

In operation, executing the advanced load instruction causes the computer to perform the load operation that would have been performed by the load instruction, but performing it earlier in the instruction sequence. Executing the load check instruction causes the computer to determine whether or not the advanced load data may be or should have been used. It may be or should have been used if the data from the memory location targetted by the advanced load is not affected by a store instruction (such as a store or a semaphore) that occurred after execution of the advanced load instruction and before execution of the load check instruction, as described more fully below.

Figure 5:
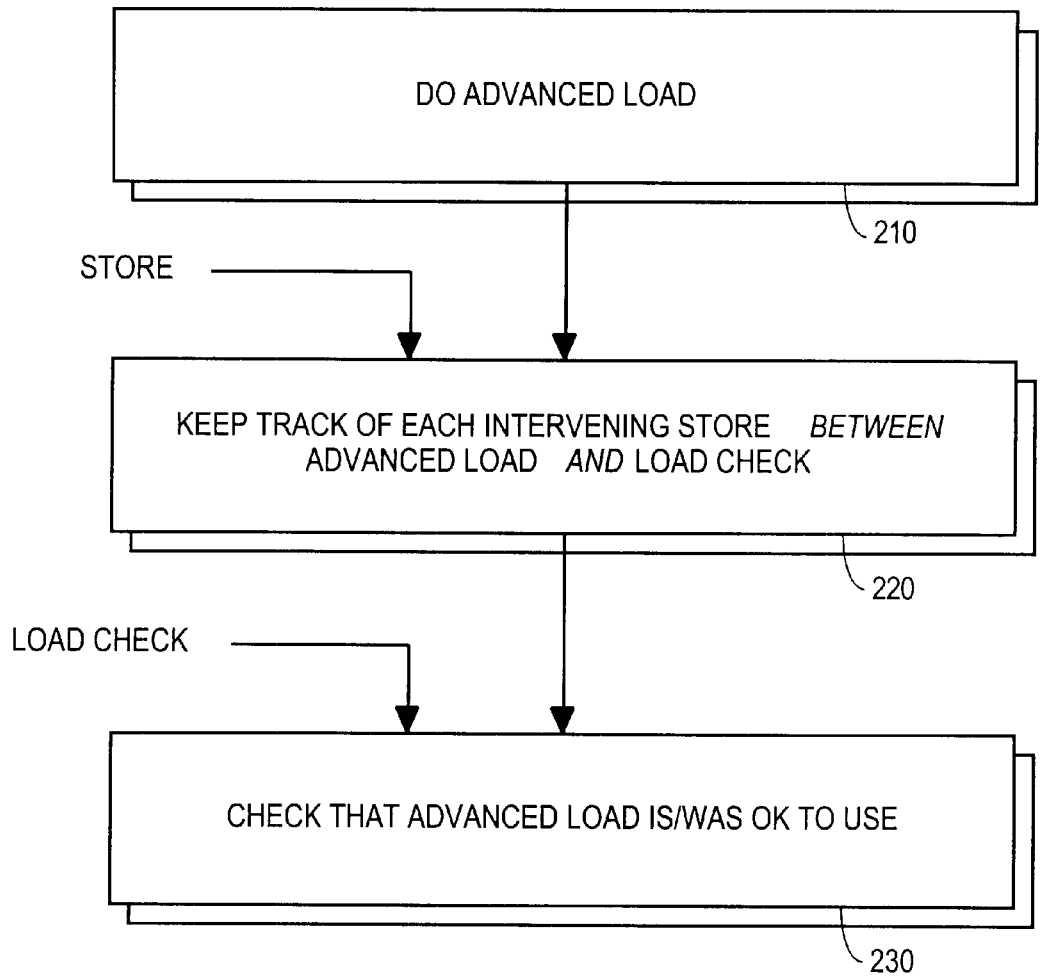
FIGS. 5 and 6 illustrate computer program logic flow according to aspects of the present invention.

FIG. 5 illustrates the logic flow according to one embodiment of the present invention. In FIG. 5, box 210 represents executing the advanced load instruction which causes the computer to perform an advanced load at a particular memory location. Box 220 represents what occurs when an intervening store instruction is executed after the advanced load instruction. Executing the store instruction causes the computer to perform a store operation to a particular memory location. The apparatus of the present invention, described more fully below, keeps track of each intervening store operation between the advanced load instruction and the load check instruction, and determines whether or not the store operation is to the same physical address in memory as was the advanced load operation.

Box 230 of FIG. 5 represents what happens when one type of load check instruction is executed. The load check instruction may be located in the sequence of program instructions after the undisambiguated store and after (with recovery code) or before a dependent use of the data. Thus before executing the instruction that uses the load data, the computer determines whether or not the advanced load data is or was safe to use. If it is or was safe to use, the load check passes and the computer essentially does nothing other than go on to execute the next instruction. In one embodiment of the present invention, when the load check passes, the load check instruction is treated as a no-operation instruction (i.e. the load check instruction has no effect if the check passes); however, it may be treated otherwise. To accommodate high performance in superscaler microprocessors, that is, microprocessors that can perform multiple operations in a single clock cycle (which includes most modem microprocessors), the load check instruction may have no effect if the check passes. For improved performance in a superscaler microprocessor, the load check instruction may be issued in parallel with the dependent use of the advanced load data that is being checked, such that there is no expected hazard between the check and the consumer of the load's data (assumes the load check instruction passes).

If the store-type operation affects the memory targetted by the prior advanced load, then the load check instruction fails, and the advanced load data may not be or should not have been used by a subsequent instruction. When the load check fails, the computer may be made to re-execute the load (to get the more up-to-date data) before performing any subsequent instructions (even those in parallel if they come later in the code stream).

Figure 6:
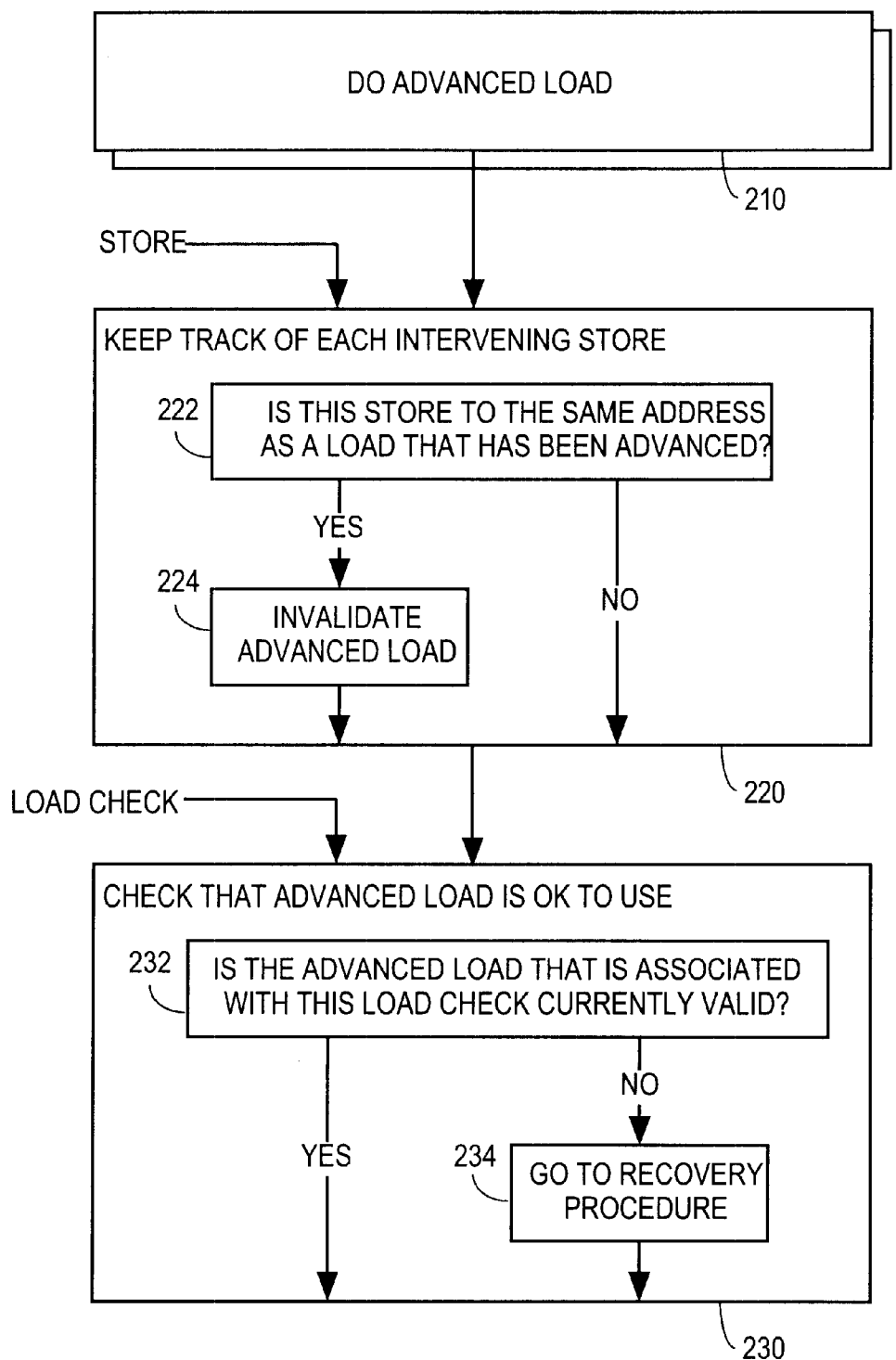
Figure 7:
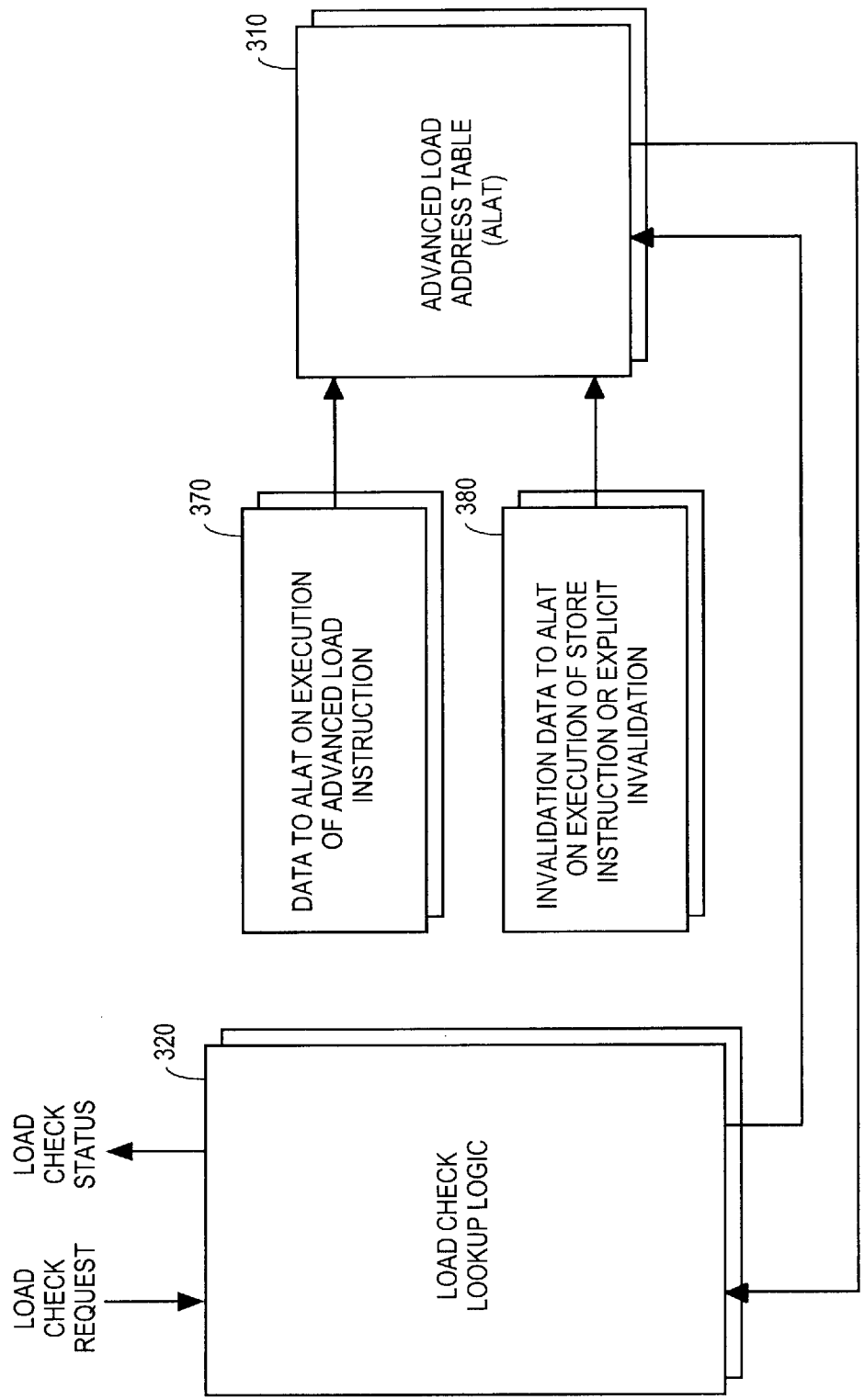
FIG. 7 illustrates lookup logic and an advanced load address table according to another aspect of the present invention.
Figure 8:
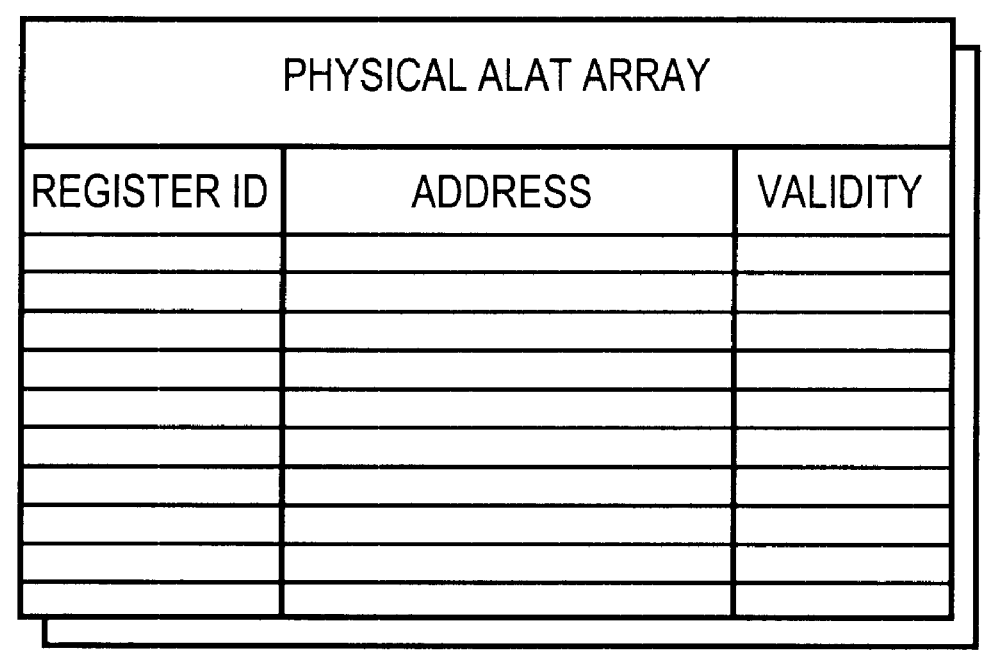

Referring to FIGS. 6, 6A, 7, and 8, FIGS. 6 and 6A illustrate in greater detail the logic flow of two particular embodiments of the present invention, and FIGS. 7 and 8 illustrate structure according to one embodiment of the present invention. In one aspect, the present invention keeps track of each intervening store operation (box 220 of FIGS. 5 and 6), and, at box 222, checks to determine if the address of the store operation overlaps the address space accessed by any of the loads that have been advanced (box 210 of FIGS. 5 and 6). If there is a conflict, then the advanced load is invalidated at box 224.

To perform these steps, the present invention provides an Advanced Load Address Table (ALAT) 310, and load check lookup logic 320, coupled one to the other as illustrated in FIG. 7. The ALAT 310 is illustrated in greater detail in FIG. 8. For each advanced load, an entry is made in the ALAT, as described more fully below. According to one embodiment of the present invention, when a load check instruction is executed and the load check passes, the advanced load entry is removed from the ALAT. This embodiment may be found to be advantageous if the load will not be used again. According to another embodiment, the advanced load entry is not removed, which may be advantageous if the load data is used again by a later instruction, and the load has been boosted above a store operation (a second check load may be required to indicate that the load data is still useable). For example:

ld.a [r9]→r10
    add r1+r2→r3
    store [r4], r5
    sub r6–r7→r8
    ld.c.nc [r9]→r10
    and r10, r11→r12
    store [r13], r14
    ld.c [r9]→r10
    and r10, r15→r16

The ld.c.nc or check-load-no-clear operation will not cause the ALAT to invalidate a matching entry when it completes. The second "and" operation depends upon data checked by the second load check. In yet another embodiment, the load re-executed by a failing ld.c will also create a new ALAT entry which may be checked by subsequent load checks (generates/act as a new advanced load if the ld.c fails).

In operation, the ALAT contains data for each advanced load, including register identification data, address data, and validity data. Thus in this embodiment of the present invention, for each advanced load three fields of data are entered into the ALAT array as shown in FIG. 8.

The register identification data is the unique register identification of the register targeted by the advanced load. This identification or tag is used to look up data in the ALAT when the load check operation is subsequently performed. A unique identifier is needed to correlate a particular advanced load with its corresponding load check. In one embodiment of the present invention, the physical index of the advanced load's target register within the microprocessor's register file is used as the register identification data. In another embodiment, the physical index of the advanced load's target register plus one or more bits is used. The latter embodiment may advantageously be used in an implementation having a rotating register stack where, consequently, multiple copies of a particular register might exist at a given time. This embodiment may also be used in an implentation that includes multiple register sets (like one Floating-Point and one Integer) where multiple registers could have the same physical indexes.

The address data is a subset of the entire address of the advanced load; however, the entire address, rather than a subset, may be used if desired. This address data is used to compare with later store operations, to determine whether or not a match/overlap exists.

The validity data field, in one embodiment of the present invention, consists of a single validity bit. In operation, the validity data field indicates whether or not the entry is valid, that is, whether or not the particular advanced load is/was safe to use. In one embodiment, the valid bit is set (i.e. set to a value that indicates that the entry is valid) when a new ALAT entry is made or allocated, and is cleared (i.e. set to a value that indicates that the entry is not valid or is/was not safe to use) if a later architecturally committed overlapping store operation is encountered. According to another aspect of the present invention, a validity bit also may be cleared and thus an ALAT entry explicitly invalidated, by the execution of a specific instruction (like an instruction that flushes ALAT entries or a load check that invalidates an entry once it is checked) or by the occurrance of a particular event (like a snoop that hits an ALAT entry or a rotating register file wrap-around that would cause ALAT register identifiers to be reused).

In operation, all validity bits in the ALAT array 310 may be initialized to an invalid state. Thereafter, when an advanced load operation is performed (box 210 of FIG. 6) an entry, 370, is made into the ALAT array 310 of FIG. 7, entering register identification and physical address information into the ALAT array for the particular advanced load. The validity bit may be set once the identification and address data have been entered into the ALAT.

In one embodiment of the present invention, advanced loads which fail to complete properly, but are architecturally committed, may still allocate ALAT entries, but the validity bits of those entries may be cleared.

In another embodiment of the present invention, advanced loads may be entered into the ALAT with their validity bits cleared for timing optimizations. In still another embodiment, advanced loads which fail to complete properly are not entered into the ALAT.

When a later instruction is executed that causes a store to memory, the address of the store operation, 380, is compared to the address contained in the ALAT 310 for each advanced load. If no match is found, nothing is done; if a match is found, the validity bit in the ALAT array for that particular advanced load is cleared (box 224 of FIG. 6), thereby indicating that the advanced load data is/was not safe to use.

In the event that a second advanced load is executed with the same register identifier as a previous advanced load, then the address, register identifier and validity information of the second advanced load will be used to replace that of the first. If the second advanced load fails to complete correctly (but was architecturally committed), then the validity bit for that advanced load may be cleared upon entry into the ALAT. Additionally, ALAT entries may be replaced by subsequent advanced loads due to capacity reasons.

Later in the program instruction sequence, a load check instruction is executed (box 230 of FIGS. 5 and 6. This entails a load check request being sent to the load check look-up logic 320 of FIG. 7. In response to this request, the load check look-up logic 320 queries the ALAT 310 to determine if the advanced load data associated with the check load being performed is/was safe to use. The data is deemed safe if the ALAT contains an entry which has its validity bit set and also has the same register identification as the load check being executed. The load check look-up logic 320 then reports the load check status as safe (pass) or unsafe (fail).

Figure 9:
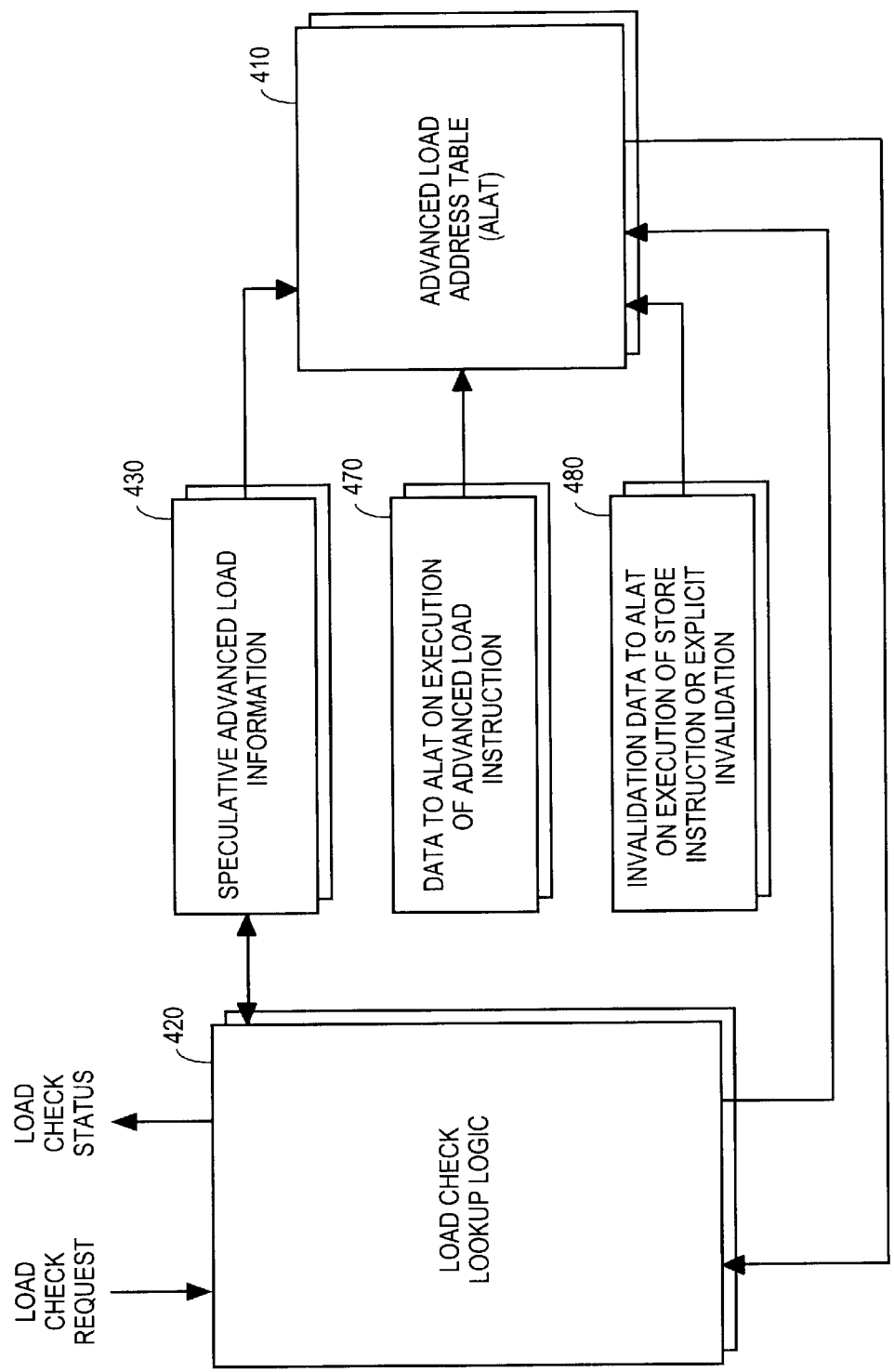
FIGS. 9 and 10 illustrate an embodiment of the present invention including a speculative advanced load structure.
Figure 10:
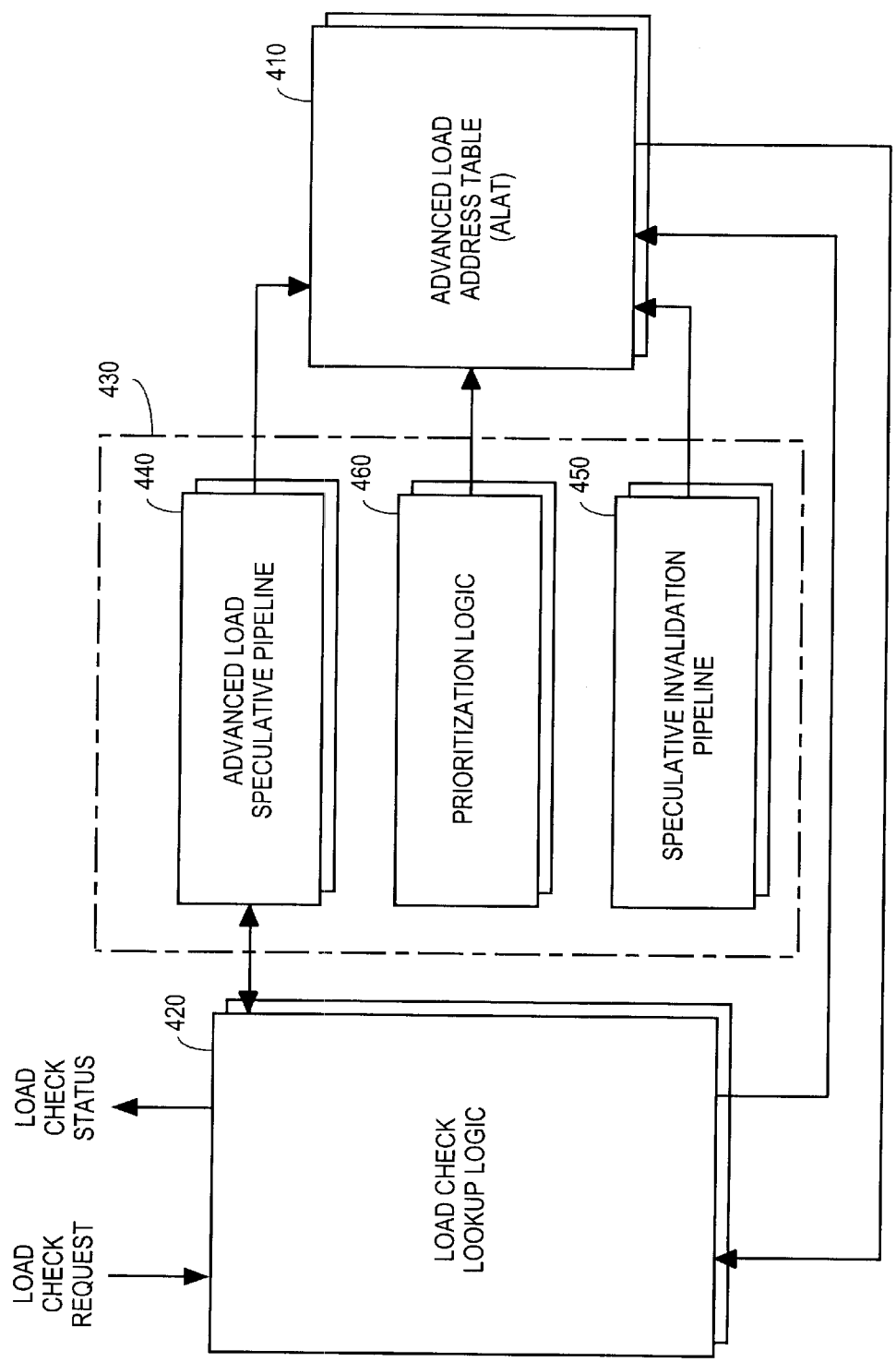

FIGS. 9, 10, and 11 illustrate structure according to another embodiment of the present invention, for use with a microprocessor capable of speculative execution. Referring now to FIGS. 9 and 10, an ALAT 410 is coupled to load check lookup logic 420, and speculative advance load information structure 430 is coupled to each. The speculative advanced load information structure 430 includes an advanced speculative load pipeline 440 and a speculative invalidation pipeline 450, each of which are coupled to the ALAT 410. Also included is prioritization logic 460 coupled to both pipelines, and to the load check lookup logic 420.

In operation, the advanced load pipeline 440 keeps track of the register identification and address of each speculative advanced load, and the speculative invalidation pipeline 450 keeps track of events and speculative instructions that invalidate each such advanced load until the loads/events and invalidation instructions become non-speculative respectively. An advanced load, event or invalidation instruction is considered speculative until the outcome of all prior branches and exceptions which could cause that load, event, or instruction to be aborted are known. In one embodiment of the present invention, the advanced load and invalidation instructions are considered speculative until they reach the write back or architectural commit stage of the pipeline. At that stage, the instructions are retired, and the relevant speculative advanced load data contained in the pipelines for the particular advanced load is added to the ALAT. In addition, the ALAT entries which correspond to advanced loads which overlap or match invalidation events and invalidation instructions are invalidated. If, however, some problem has occurred, for example an earlier instruction caused an exception to be taken or a branch was mispredicted and the speculative advanced load or invalidation instruction was aborted before completion, then the speculative operation would not reach the write back stage and the ALAT would not be updated.

In another embodiment of the invention, speculative invalidation operations may be allowed to invalidate ALAT entries before they are architecturally committed or even when they are not architecturally committed. This embodiment may be found useful for timing purposes.

According to one embodiment of the present invention, load address and store address match/overlap comparisons are made on fewer bits for speculative advanced loads than for non-speculative advanced loads, to facilitate a high frequency pipeline, as more fully described below.

The prioritization logic 460 prioritizes between speculative advanced loads, invalidation events, and speculative invalidation instructions that are in the pipeline, with later instructions taking precedence over earlier instructions and existing ALAT entries.

In operation, the load check look-up logic 420 responds to a load check request by querying both the ALAT 410 and prioritization logic 460. ALAT 410 is queried for non-speculative advance loads that have not been invalidated and do not overlap/match with events or speculative invalidation instructions that precede the load check. The prioritization logic 460 is queried for speculative advanced loads that do not overlap/match with events or speculative invalidation instructions that are preceeded by the speculative advanced load and precede the load check. These queries may be done using the register identification as the tag for the request. If an advanced load is represented in the ALAT and/or the prioritization logic is valid (as described earlier) and has the same register identification as the load check, then the load check will pass. If both the ALAT and the prioritization logic respond to the look-up, then according to one embodiment of the present invention, the look-up logic 420 will report the information from the prioritization logic 460 over the information from the ALAT 410. For example, for the code sequence:

ld.a [r9]→r10
add r1+r2→r3
store [r4], r5
sub r6−r7→r8
ld.a [r9]→r10
store [r3], r8
ld.c [r9]→r10
and r10, r15→r16

If the first advanced load enters the ALAT, and the second advanced load is contained within the prioritization logic when the load check has its look-up performed, the load check pass/fail may be determined by the second store and the second advanced load. This may take precedence over the first advanced load and the first store.

The ALAT 410 is shown in greater detail in FIG. 11. In this embodiment, the physical ALAT array contains an entry for each advanced load. Each entry has four fields: a register identification field; an address field; an octet field; and a validity field. In one embodiment of the present invention the physical ALAT array contains 32 entries, organized in a 2-way set-associative form, with each entry having the above-identified four fields (thus there are 2 ways, each with 16 entries). In other embodiments direct-mapped, other multi-way set-associative, or fully-associative structures may be used.

The register identification field contains the unique register identification of the register targeted by the advanced load. This identification or tag is used by the load check lookup logic 420 when a subsequent load check instruction is executed. In one embodiment of the invention, the register identification field contains 7 bits which correspond to the register's physical index within the processor's register file. A lesser or greater number of bits may be used as desired, without departing from the spirit of the present invention.

The address field, as illustrated in FIG. 8, contains some subset of the entire address of the advanced load and, in one embodiment of the present invention, bits 4–19 (16 bits) of the address. This address field is used to compare with later invalidation instructions and events (like stores, semaphores, snoops, ALAT invalidation instructions, etc.) to determine whether or not a match/overlap exists. The use of a 16 bit address field was selected because it was considered sufficient to minimize false ALAT matches/invalidations under typical use. Erroneous ALAT matches created by using this approach will simply result in unnecessary load check failures, which may cause re-execution of a load or the execution of recovery code as opposed to any functional failure.

The octet field keeps track of which bytes within a cache line were read by an advanced load. In one embodiment, only 32 bytes within a cache line are tracked, requiring only 12 bits, as described more fully below.

The validity field contains a validity bit, which indicates whether or not the entry is valid. The valid bit is set when a new ALAT entry is made, and is cleared if a later non-speculative matching/overlapping store operation is encountered. An entry also can be explicitly invalidated by the execution of a specific instruction or by the occurrence of a particular event.

The addresses used by the ALAT are chosen to be physical addresses to allow the structure to avoid memory aliasing issues (that is, issues raised when two different virtual addresses represent the same physical address). Physical addresses are typically known later than virtual addresses. Thus, in the event that the priority logic contains speculative instructions, the entire physical addresses of those instructions may not be known at the time when a load check instruction is being executed One embodiment of this invention addresses this issue by reducing the address compare to only that portion of the address for which the physical and virtual are the same (for a processor with a minimum page size of 4 k, the address bits 11:0 may be the same for both the physical and virtual representations) until the entire physical address is available. This reduced compare may be acceptable because a store instruction/invalidation instruction which overlaps an advanced load may be detected. Unfortunately, this particular method may be less accurate because a store instruction/invalidation instruction which does not actually match/overlap, but has the same address 11:0 could incorrectly cause an advanced load to be invalidated. However, this behavior is still functionally correct as the result of a false invalidation will be to fail the load check and thus to re-execute the load or to execute recovery code before continuing instruction execution.

When the physical address can be known in time, one embodiment of the present invention does a compare using the full 16 bits of the address subset contained in the ALAT address field.

In an embodiment of the present invention, the address of the store is compared to the address of all advanced loads in the ALAT, in parallel, using a content addressable memory (CAM). Other schemes may be used without departing from the spirit of the present invention.

According to one embodiment of the present invention, the address data used for comparing store instruction addresses with advanced load addresses is the starting memory address of each. This may work for loads and stores of the same data size when the data is correctly aligned. The load and store of such data to the same address results in the load and store coinciding or totally overlapping in memory.

According to another embodiment of the present invention, the above-mentioned octet field, and an octet mask scheme, are used to deal with partial overlaps in memory. A partial overlap occurs when executing an advanced load instruction causes the computer to load data from a first physical region of memory, and executing a subsequent store-type instruction causes the computer to store data into a second physical region in memory, and the first and second physical regions in memory partially coincide. When they completely coincide, the address field in the ALAT (the physical address of the advanced load) may be the same as the physical address of the store-type instruction. However, in the case of a partial overlap, the physical addresses of the advanced load and store-type instruction may be different.

For example, partial overlaps can occur when an advanced load instruction and store-type instructions are of different sizes and/or begin/end at different addresses. In the event that an advanced load was performed to read bytes 0–31 from memory, and the store instruction was then executed causing the computer to store data into memory bytes 25–32, then the advanced load and store partially coincide or overlap in that each used memory locations 25–32. In such a situation, the advanced load is unsafe and its data may not be used (because memory locations 25–32 were affected by a subsequent store). Similarly, if the advanced load read data from bytes 5–12 of memory, and a subsequent store caused the computer to write data to memory locations 8–15, the advanced load is again unsafe because the advanced load and store partially overlapped by using memory bytes 8–12. The octet field and octet mask aspect of the present invention deals with such occurrences.

A mask is a binary value used to selectively screen out or let through certain bits in a data value. Masking is performed by using a logical operator (AND, OR, XOR, NOT) to combine the mask and the data value. For example, the mask 0011111111, when used with the AND operator, removes or masks off the two upper-most bits in a data value, but does not affect the rest of the value.

In one embodiment of the present invention, the ALAT keeps track of addresses in two components, one compentent representing the address of the 32-byte cache line accessed (address bits 19 through 5), and a second representing the bytes accessed within the 32-byte line (address bits 4 through 0 and the access size). Since this embodiment of the present invention is set up for a 32-byte cache line, a straight-forward implementation would be to use 32 bits to represent which bytes within a line would be matched against (had been read by an advanced load). However, in the present octet maksing scheme, 4 bits are used to indicate which 8-byte "chunks" within a line are to be matched, and an additional 8-bits are used to indicate which bytes within the chunks are to be matched. This scheme may work just as well as the straight-forward scheme when data is naturally aligned (the majority of loads/stores encountered) and may only behave sub-optimally for data which is misaligned (a minority of loads/stores). Advantageously, this scheme reduces the number of bits needed to keep track of the bytes within a line from 32 to 12. In operation accesses would set/use bits as shown below:

| Address 4:0 | Size    | Octet Chunk Bits | Octet Byte Bits |
|-------------|---------|------------------|-----------------|
| 01100       | 2 bytes | 0010             | 00110000        |
| 00011       | 4 bytes | 0001             | 01111000        |
| 10100       | 8 bytes | 1100             | 11111111        |
| 10111       | 4 bytes | 1100             | 10000111        |

The Octet Chunk Bits are set according to which 8-byte chunks within a 32-byte cache line have been accessed. For the third entry in the table above, an 8-byte access to address 20, the access will begin in the third 8-byte chunk and end in the fourth chunk, therefore Octet Chunk bits 3 and 4 are set. The Octet Byte Bits are set according to which bytes within the 8-byte chunks are accessed. For the second entry in the table above, a 4-byte access to address 3, the access will begin at byte 3 (starting at 0) and ends at byte 6, so Octet byte bits 3 through 6 are set. For the third entry, in the table above, an 8-byte access to address 20, the access crosses two 8-byte chunks. In chunk 3, the access begins at byte 4 (starting at 0), and ends at byte 7. In chunk 4, the access begins at byte 0 and ends at byte 3. Therefore, Octet Byte Bits 0 through 7 are set because all bytes were accessed in either chunk 3 or chunk 4. This adds an inaccuracy to the Octet Match calculations (for unaligned accesses) but can only result in false invalidations and not functional errors.

An Octet Match occurs when an access and an ALAT entry have any Octet Chunk bit in common, and an Octet Byte Bit in common.

The ALAT structure described above permits implementing advanced loads, which permits higher performance through improved compiling of computer programs. The reduced address compare aspect of the present invention allows high performance in most cases, that is, when the distance between the store instruction and the load check instruction is sufficient to allow physical address comparisons, and reasonable performance in the remaining cases, while still allowing high frequency operation. The octet masking scheme of the present invention permits an advanced load address and store address matching scheme which achieves the ideal case in the vast majority of situations, while allowing a significant die area savings.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A processor comprising:
    an advanced load address table (ALAT) to store data associated with an advanced load operation; and
    load check lookup logic to access the ALAT in response to executing a load check instruction after a dependent instruction, that uses data to be loaded by the advanced load operation, has been executed.

2. The processor of claim 1, wherein the ALAT includes storage locations for a register ID, an address, and validity information associate with the advanced load instruction.

3. A method comprising:
    an advanced load address table (ALAT) storing data associated with an advanced load operation;
    load check lookup logic accessing the ALAT in response to executing a load check instruction;
    an advanced load speculative pipeline storing data associated with a speculative advanced load instruction;
    a speculative invalidation pipeline storing data associated with a speculative invalidation instruction; and
    prioritization logic prioritizing between the speculative advanced load instruction, the speculative invalidation instruction, and the advanced load instruction.

4. The method of claim 3, wherein the ALAT includes storage locations for a register ID, an address, and validity information associate with the advanced load instruction.

5. A machine-accessible medium that provides instructions that, if executed by a processor will cause said processor to perform operations comprising:
    an advanced load address table (ALAT) storing data associated with an advanced load operation;
    load check lookup logic accessing the ALAT in response to executing a load check instruction;
    an advanced load speculative pipeline storing data associated with a speculative advanced load instruction;
    a speculative invalidation pipeline storing data associated with a speculative invalidation instruction; and
    prioritization logic prioritizing between the speculative advanced load instruction, the speculative invalidation instruction, and the advanced load instruction.

6. The machine-accessible medium of claim 5, wherein the ALAT includes storage locations for a register ID, an address, and validity information associate with the advanced load instruction.

* * * * *

UNITED STATES PATENT AND TRADEMARK OFFICE
CERTIFICATE OF CORRECTION

PATENT NO. : 6,658,559 B1
DATED : December 2, 2003
INVENTOR(S) : Arora et al.

It is certified that error appears in the above-identified patent and that said Letters Patent is hereby corrected as shown below:

<u>Column 1,</u>
Line 31, delete "Modem", insert -- Modern --.

Signed and Sealed this

Second Day of March, 2004

JON W. DUDAS
*Acting Director of the United States Patent and Trademark Office*